Jan. 28, 1964  G. W. CLEEK ETAL  3,119,703
INFRARED TRANSMITTING GLASSES
Filed July 31, 1961  4 Sheets-Sheet 1

INVENTORS
GIVEN W. CLEEK
EDGAR H. HAMILTON

BY W.O. Quesenberry
Claude Funkhauser ATTORNEYS

INVENTORS
GIVEN W. CLEEK
EDGAR H. HAMILTON

United States Patent Office 3,119,703
Patented Jan. 28, 1964

3,119,703
INFRARED TRANSMITTING GLASSES
Given W. Cleek, Arlington, Va., and Edgar H. Hamilton, Silver Spring, Md., assignors to the United States of America as represented by the Secretary of the Navy
Filed July 31, 1961, Ser. No. 128,641
5 Claims. (Cl. 106—47)
(Granted under Title 35, U.S. Code (1952), sec. 266)

The invention described herein may be manufactured and used by or for the Government of the United States of America for governmental purposes without the payment of any royalties thereon or therefor.

This invention relates to glass compositions and more particularly to infrared transmitting glass compositions based on the $BaO$—$TiO_2$—$GeO_2$ ternary system.

This application is a continuation-in-part of application Serial No. 598,482, filed July 17, 1956, now U.S. Patent 3,022,182.

Application of infrared transmitting glasses in the field of optics has become more prevalent and diversified due largely to the demands presented by military usages, such as in optical lenses for aerial photography equipment and fire control instruments operating in wavelength ranges from the visible region to 5.0 microns. Stringent requirements of physical and chemical properties for infrared transmitting glasses have been made necessary due to the wide range of environmental factors surrounding practical applications of the devices which employ these glasses.

Research directed toward the development of serviceable glasses based on ternary systems, such as $K_2O$—$CaO$—$SiO_2$ and $K_2O$—$PbO$—$SiO_2$, has led to the discovery of commercial glasses which are fluid enough at an industrially accessible temperature to be melted on a commercial scale, viscous enough to be worked above its freezing point so that devitrification cannot take place, and which have physical properties and chemical durability suitable for the purpose for which they are intended. However, studies made to lead to the production of special-type glasses capable of resisting chemical and physical change ordinarily brought about through exposure to extremes of heat and cold and corrosive chemicals have resulted in the finding of relatively few acceptable glasses, particularly those needed in the infrared transmitting ranges principally due to the strong water absorption band found in most alkali-containing glasses at about 2.75 microns.

An object of the present invention is to provide infrared glasses of high refractive index.

Another object of the invention is the provisions of infrared transmitting glasses having high deformation temperatures.

Another object is to provide glasses having good chemical durabilities such as resistance to attack over the entire pH range and low hygroscopicity.

A further object is to provide infrared glasses of a composition which enables the glass to be cooled from a molten state without crystallization.

A still further object of the invention is the provision of a glass having good transmittances in the near infrared at wave lengths below six microns.

Another object is to provide multi-component glass compositions based on the $BaO$—$TiO_2$—$GeO_2$ ternary system which may be formed in relatively large amount melts.

Another object is to make alkali-free glasses having relatively low absorption in the 2.75 to 3.00 micron region.

Other objects and many of the attendant advantages of this invention will be readily appreciated as the same becomes better understood by reference to the following detailed description when considered in connection with the accompanying drawings wherein.

Figure 1:
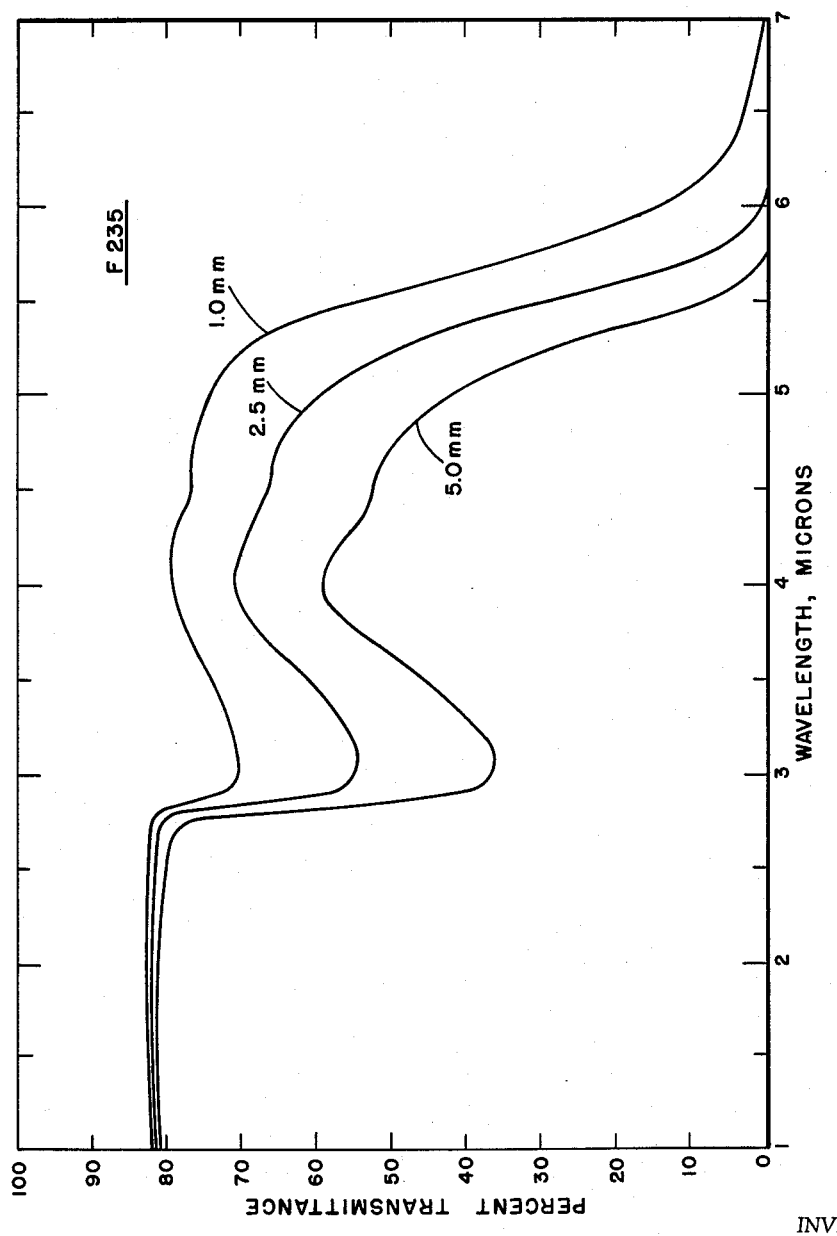
FIG. 1 is a graph showing transmittance curves for various thicknesses of a specific glass of this invention.

According to the present invention it has been found that multicomponent glasses having desirable characteristic properties may be developed from the ternary base glasses of the $BaO$—$TiO_2$—$GeO_2$ system. Not only has it been discovered that glasses comprising the present invention are feasible in their intended use in optical lens devices requiring infrared wave transmission, but also that because of their relatively low melting temperature of from 1300–1400° C. the glasses may be prepared in large melts with less fear of contamination, a factor which contributes to mass production of the glasses in distinction to laboratory production of limited amounts.

Examples of specific compositions which are preferred embodiments of the present invention are as follows:

TABLE I

Compositions of $GeO_2$ Glasses

[Mole Percent]

| Component | Glass Number | | | |
|---|---|---|---|---|
| | F234 | F235 | F997 | F998 |
| $GeO_2$ | 36 | 35 | 45 | 45 |
| $BaO$ | 20 | 18 | 22 | 18 |
| $TiO_2$ | 30 | 30 | 10 | 10 |
| $La_2O_3$ | 7 | 7 | 7 | 7 |
| $ZrO_2$ | 3 | 3 | 5 | 5 |
| $ThO_2$ | 3 | 3 | | |
| $Ta_2O_5$ | 1 | 1 | 1 | 1 |
| $PbO$ | | 2 | | |
| $WO_3$ | | 2 | | |
| $ZnO$ | | | 10 | 10 |
| $BaF_2$ | | | | 4 |
| Liquidus Temperature, °C | 1,233 | 1,220 | 1,108 | 1,105 |
| Max. Melting Temperature, °C | 1,410 | 1,350 | 1,340 | 1,345 |
| $N_D$ | 1.97552 | 1.99284 | 1.86410 | 1.85477 |

(It is important to note that these glasses have refractive indices, $N_D$, above 1.85 and one of them, F235, has a value of 1.99.)

These preferred glasses of the present invention containing $BaO$, $TiO_2$, and $GeO_2$ as the principal constituents have been found to have high refractive indices, good transmittances in the near infrared at wave lengths below six microns, high deformation temperatures, desirable elastic constants, and good chemical durabilities.

The refractive indices of these glasses are comparable to extra dense flints as can be seen in the following table.

TABLE II
*Refractive Indices of GeO$_2$ Glasses*

| Wavelength, microns | Glass Number | | | |
|---|---|---|---|---|
| | F234 | F235 | F997 | F998 |
| 0.4358 | 1.9890 | 2.0438 | | 1.88997 |
| 0.4861 | | | 1.88315 | 1.87470 |
| 0.5461 | 1.9479 | 2.0007 | | |
| 0.5780 | 1.9407 | 1.9896 | | |
| 0.5893 | | | 1.86410 | 1.85597 |
| 0.6563 | | | 1.85658 | 1.84866 |
| 1.014 | 1.9029 | 1.9537 | | 1.83082 |
| 1.1287 | 1.8986 | 1.9504 | | 1.82801 |
| 1.3622 | 1.8933 | 1.9446 | | 1.82374 |
| 1.5295 | 1.8902 | 1.9413 | | 1.82142 |
| 1.6606 | 1.8880 | 1.9392 | | |
| 2.1526 | 1.8796 | 1.9312 | | 1.81364 |
| 2.4374 | 1.8752 | 1.9266 | | 1.81000 |
| 2.998 | 1.8647 | 1.9162 | | |
| 3.3033 | 1.8585 | 1.9103 | | |
| 3.5078 | 1.8539 | 1.9046 | | |
| 4.225 | 1.8345 | 1.8861 | | |
| 4.281 | 1.8333 | 1.8851 | | |

It is well known in the art of glass making that extra dense flint glasses have PbO as a major constituent, and, consequently, are not chemically durable. For example, one type of antireflection coating applied in alkaline solution cannot be used on glasses with high PbO contents due to their poor resistance to attack by alkaline solutions. The instant glasses, however, have low PbO contents, yet exhibit refractive indices comparable to that of PbO containing glasses.

Figure 2:
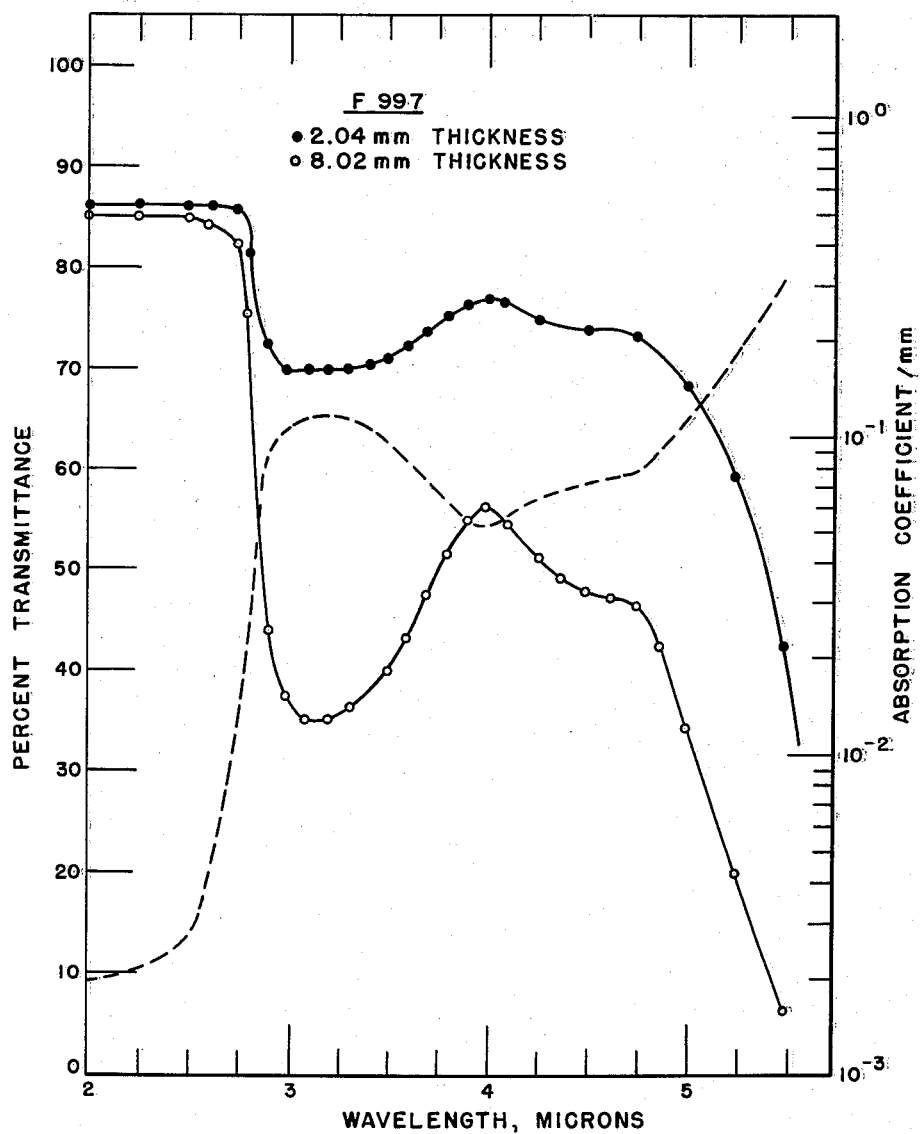
FIGS. 2 and 3 are graphs showing transmittance curves and absorption curves for glasses of this invention.
Figure 3:
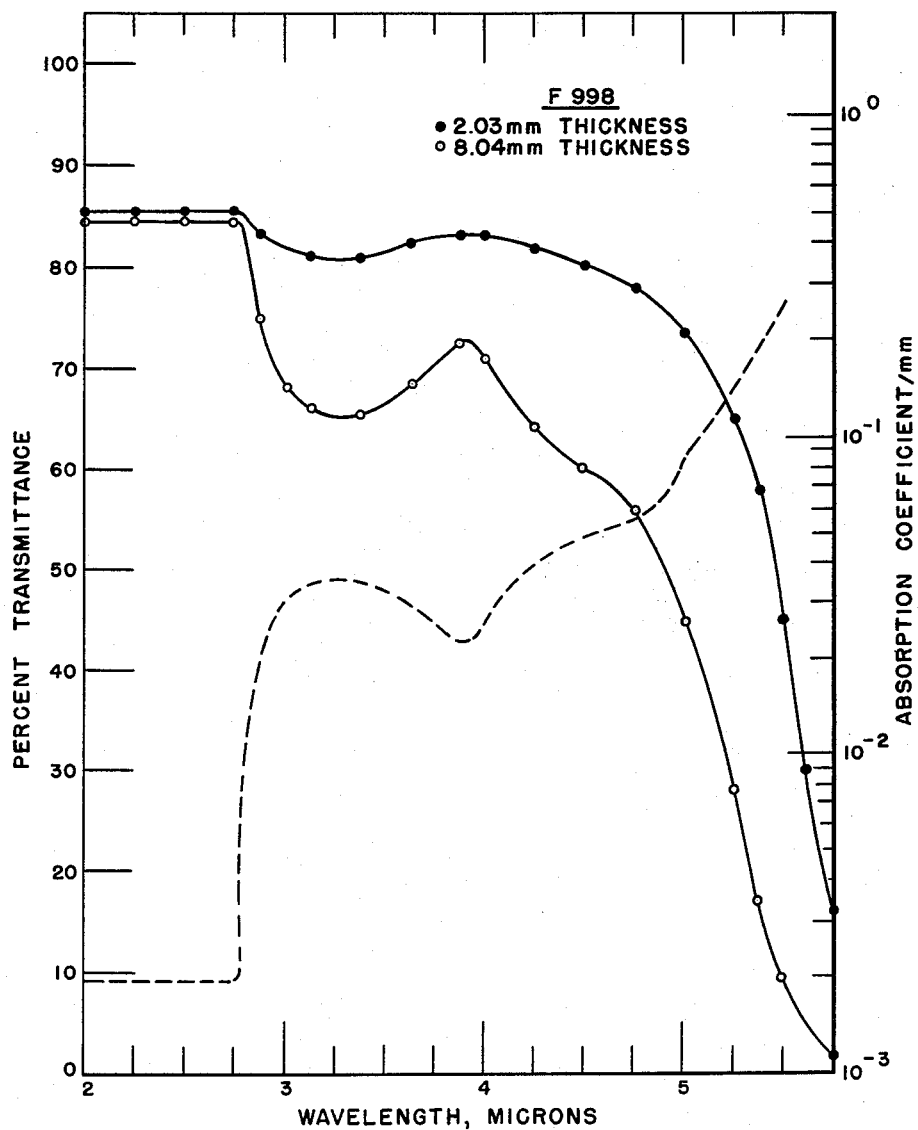

The good transmittances of these glasses in the near infrared at wave lengths below six microns are evident from FIGS. 1, 2, and 3 which show the properties of several glasses of the present invention for various thicknesses of the glasses. Consequently, the present invention provides infrared glasses with high refractive indices while at the same time provides good transmittances. This is significant in that known high refractive index glasses usually contain appreciable amounts of boron oxide, but which glasses have little or no transmittances beyond wave lengths of 2.9 microns.

Figure 4:
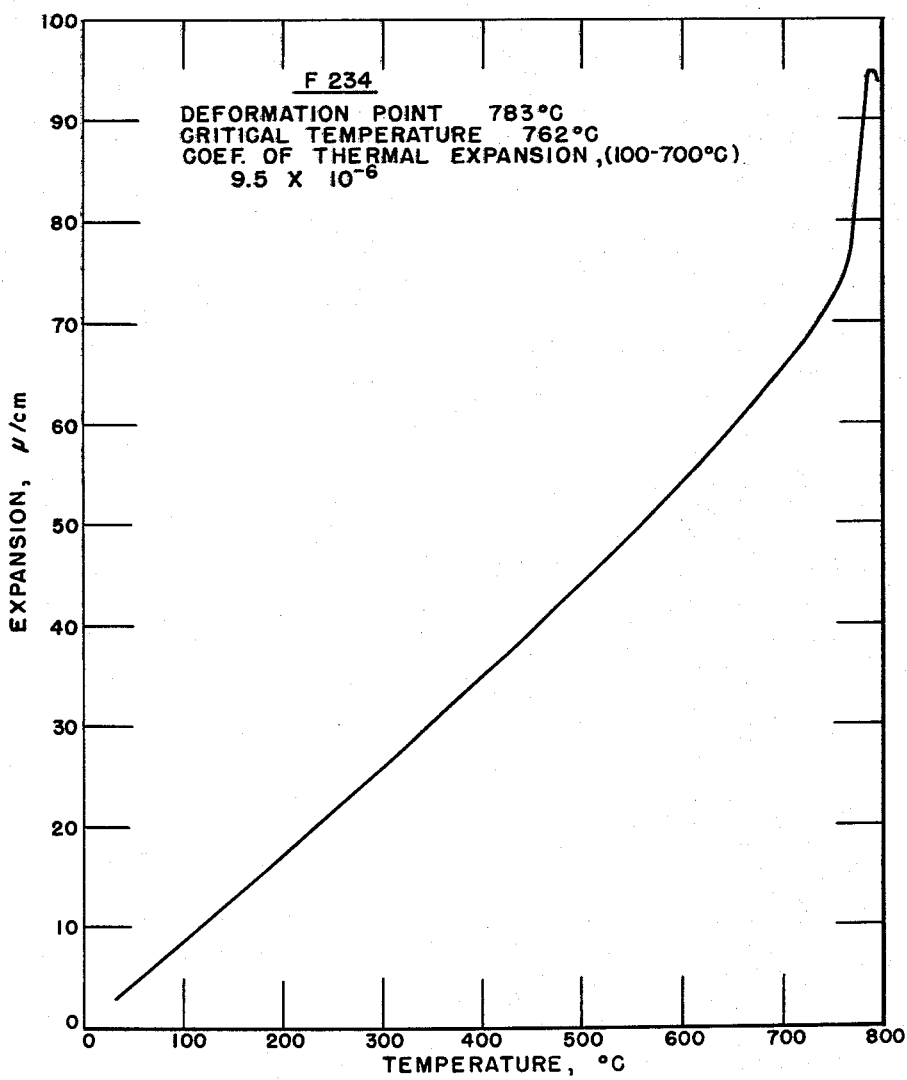
FIG. 4 is a graph showing an expansion curve for a specific glass of this invention.

The deformation temperatures, as determined by the thermal expansion method, of exemplary glasses of the invention range from 700°–783° C. For purposes of illustration, the thermal expansion curve for glass F234 is given in FIG. 4. It is important to note that the deformation temperature of 783° C. is well above that of extra dense flint glasses of comparable refractive indices, and is well above the deformation temperatures of most commercial types of glass. For the other glasses it was found that: F235 had a deformation point of 763° C., a critical temperature of 749° C., and a coefficient of thermal expansion of $8.8 \times 10^{-6}$ in the 100–700° C. range; F997 had a deformation temperature of 725° C., a critical temperature of 685° C., and a coefficient of thermal expansion of $9.3 \times 10^{-6}$ in the 100–600° C. range; and F998 had a deformation temperature of 700° C., a critical temperature of 665° C., and a coefficient of thermal expansion of $10 \times 10^{-6}$ in the 100–600° C. range.

The elastic constants of the glasses of this invention are high compared to the standard types of glasses. For example the elastic constants of glass F998 are as follows:

TABLE III
*Elastic Constants of Glass F998*

| Temperature, ° C. | Young's Modulus, Kilobars | Shear Modulus, Kilobars | Poisson's Ratio |
|---|---|---|---|
| 30 | 907.5 | 355.2 | 0.278 |
| 105 | 898.5 | 351.5 | .278 |
| 184 | 888.4 | 347.4 | .279 |
| 262 | 877.8 | 343.0 | .279 |
| 334 | 867.3 | 338.9 | .280 |
| 396 | 857.4 | 334.9 | .280 |
| 478 | 842.8 | 329.2 | .280 |
| 551 | 827.4 | 323.1 | .281 |
| 626 | 804.8 | 314.6 | .279 |
| 676 | 767.9 | 299.7 | .281 |

These indices of elastic constants depict the physical flexibility of these glasses to the extent that they are capable of withstanding physical punishment to a much greater degree than is normal for glasses. An attribute most desirable for glasses of military application where in the field they are often subjected to rigorous physical requirements.

The chemical durabilities of the glasses were determined by an interferometric method. A polished sample of each glass was immersed about one-half its length in a solution buffered to the desired pH. After six hours exposure at 80° C. the samples were viewed through an optical flat with the aid of monochromatic light. Inasmuch as any shifts in the interference bands as they passed from the unexposed to the exposed portion of the sample were proportional to the amount of attack by the buffering media, a measure of chemical durability of the sample was accurately determined. The results of tests on the samples show no detectable attack over the entire pH 2 to pH 12. The resistance of these glasses to chemical attack over the entire pH range and their low hygroscopicity make them unique as compared to commercial types of glass.

It has been revealed by this invention that small amounts of other oxides, such as $ThO_2$, $Ta_2O_5$, $WO_3$, PbO, CaO, SrO, SnO, CdO, and $Al_2O_3$, also may be included as glass components. The use of $BaF_2$, replacing some of the BaO in the batch composition, has a beneficial effect on the removal of the water absorption band at 2.75 to 3.00 microns as seen by comparison of the transmittance curves of glasses F997 and F998 in FIGS. 2 and 3.

The glasses of the instant invention are useful where infrared transmitting glasses are required as in fire control and other optical devices, for making achromatically corrected lens systems which need glasses having high refractive indices and dispersions over a considerable range, and where good chemical durability is necessary for withstanding chemical attack as in antireflection coatings applied to lens elements.

Obviously many modifications and variations of the present invention are possible in the light of the above teachings. It is therefore to be understood that within the scope of the appended claims the invention may be practiced otherwise than as specifically described.

What is claimed is:

1. A non-crystalline infrared transmitting glass having a high refractive index, good transmittances at wavelengths below six microns, high deformation temperatures, and good resistance to chemical attack over the entire pH range consisting of:

35–45 mole percent of $GeO_2$
   18–22 mole percent of BaO
   10–30 mole percent of $TiO_2$
   approx. 7 mole percent of $La_2O_3$
   3–5 mole percent of $ZrO_2$ and at least one member of the group consisting of approximately 3 mole percent of $ThO_2$, 1 mole percent of $Ta_2O_5$, 2 mole percent of PbO, 2 mole percent of $WO_3$, 10 mole percent of ZnO, and 4 mole percent of $BaF_2$.

2. A non-crystalline infrared transmitting glass having a high refractive index, good transmittances at wavelengths below six microns, high deformation temperatures, and good resistance to chemical attack over the entire pH range consisting of:

36 mole percent of $GeO_2$
   20 mole percent of BaO
   30 mole percent of $TiO_2$
   7 mole percent of $La_2O_3$
   3 mole percent of $ZrO_2$
   3 mole percent of $ThO_2$
   1 mole percent of $Ta_2O_5$.

3. A non-crystalline infrared transmitting glass having a high refractive index, good transmittances at wavelengths below six microns, high deformation temperatures, and good resistance to chemical attack over the entire pH range consisting of:

35 mole percent of $GeO_2$
18 mole percent of BaO
30 mole percent of $TiO_2$
7 mole percent of $La_2O_3$
3 mole percent of $ZrO_2$
3 mole percent of $ThO_2$
1 mole percent of $Ta_2O_5$
2 mole percent of PbO
2 mole percent of $WO_3$.

4. A non-crystalline infrared transmitting glass having a high refractive index, good transmittances at wavelengths below six microns, high deformation temperatures, and good resistance to chemical attack over the entire pH range consisting of:

45 mole percent of $GeO_2$
22 mole percent of BaO
10 mole percent of $TiO_2$
7 mole percent of $La_2O_3$
5 mole percent of $ZrO_2$
1 mole percent of $Ta_2O_5$
10 mole percent of ZnO.

5. A non-crystalline infrared transmitting glass having a high refractive index, good transmittances at wavelengths below six microns, high deformation temperatures, and good resistance to chemical attack over the entire pH range consisting of:

45 mole percent of $GeO_2$
18 mole percent of BaO
10 mole percent of $TiO_2$
7 mole percent of $La_2O_3$
5 mole percent of $ZrO_2$
1 mole percent of $Ta_2O_5$
10 mole percent of ZnO
4 mole percent of $BaF_2$.

References Cited in the file of this patent

UNITED STATES PATENTS

| | | |
|---|---|---|
| 2,691,599 | Blau | Oct. 12, 1954 |
| 2,701,208 | Blau | Feb. 1, 1955 |
| 3,022,182 | Cleek et al. | Feb. 20, 1962 |
| 3,029,152 | Milne | Apr. 10, 1962 |